Nov. 1, 1955 J. DEGELMAN 2,722,650
VIBRATORY POWER SUPPLY
Filed July 27, 1951 2 Sheets-Sheet 1
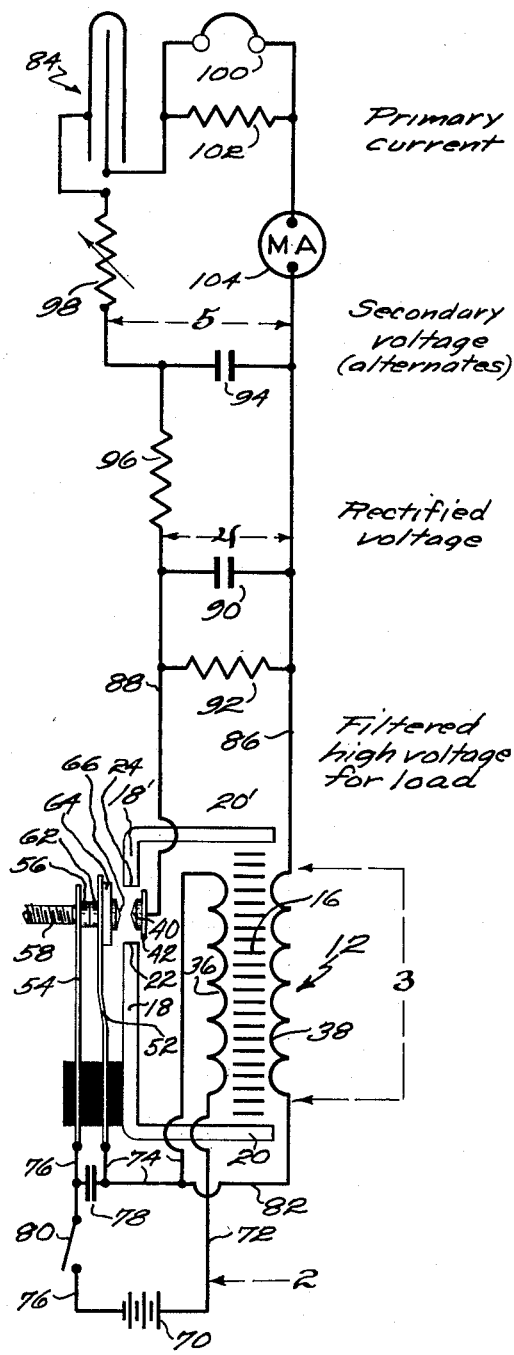
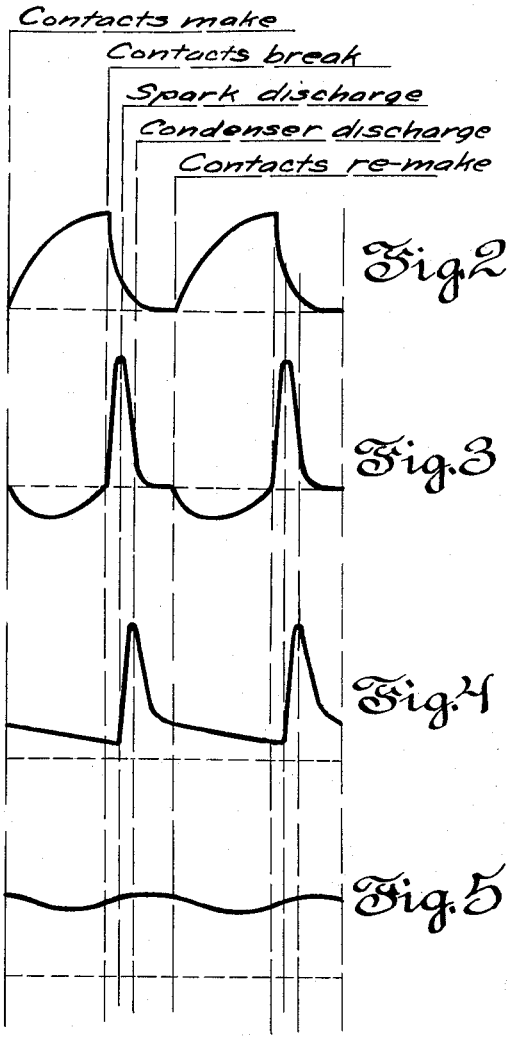
INVENTOR
John Degelman,
BY
ATTORNEY Nov. 1, 1955 J. DEGELMAN 2,722,650
VIBRATORY POWER SUPPLY
Filed July 27, 1951 2 Sheets-Sheet 2

INVENTOR
John Degelman,
BY
ATTORNEY

United States Patent Office 2,722,650
Patented Nov. 1, 1955

2,722,650

VIBRATORY POWER SUPPLY

John Degelman, Littleton, Mass., assignor to The A. C. Gilbert Company, New Haven, Conn., a corporation of Maryland Application July 27, 1951, Serial No. 238,924

18 Claims. (Cl. 321—2)

This invention relates to electrical converting systems for producing spark gap rectified current at more highly amplified voltages than has heretofore been possible with apparatus of comparable simplicity. The improvements are particularly directed to vibratory power converters usable in systems of such simple and low cost character that they are practical as a power source for portable electrical toys and yet can supply nearly constant potential of the same continuing polarity up to more than a thousand volts from a battery source intake of only a few volts.

The improvements are especially directed to power supplies for energizing utilization circuits operating on electrostatic principles without series or parallel resonant loads. Utilization circuits of this nature may incorporate as a load element a Geiger-Mueller counting tube containing an ionizable gas or vapor atmosphere responsive to emanations of radio-active substances for detecting or measuring the intensity of the radiation. Through the simplification, compacting, and lowering of cost attained by this invention my improved power supply combined with such counter-tubes becomes practical for toy use in playing at prospecting for uranium bearing ores as well as for various more serious purposes related to testing for the presence and strength of radio-active substances.

Electromagnetic vibratory power packs in compact form have long been under development to serve as a current source for automobile radio receiving sets. Early attempts made use of vibrator-transformer combinations such as those incorporated in automobile spark coils for producing continuous unidirectional current supply. This commonly involved the use of space-consuming costly full wave rectifiers. Among proposals for dispensing with the objectionable size and cost of conventional full wave rectifiers were schemes for substituting a multiplicity of pairs of make-and-break switch contacts controlling costly, space-consuming condensers usually arranged to be caused, by interrelated current switching actions of such contacts, to discharge sequentially one into another. In attempts at still further simplification it has been proposed in connection with electrostatic forms of utilization circuits to employ a spark gap in series with the secondary of an induction coil intended to serve as a very simple form of rectifier. Sparks gaps so proposed have necessitated a highly delicate balance of electrical values between the reactive characteristics of the induction coil, the mechanical performance of the vibratory circuit interrupter, and the capacitive characteristic of the utilization circuit.

The present invention aims to enable a spark gap to be used in conjunction with a vibratory circuit interrupter and its transformer circuits in a manner to rectify alternating current impulses occurring in the secondary of the transformer irrespective of the attainment of delicate electrical balance between the components of the supply or intake circuit and the components of the output or utilization circuit.

A related object is to attain higher electromagnetic efficiency in the transformer of the improved system by using a core serving, in conjunction with its vibratory circuit interrupting armature, to form a nearly closed magnetic circuit.

A further object is to arrange the vibrating armature so that it spans a small space between opposite pole faces of a C-type or broken-loop type of transformer core and is strongly responsive to the magnetic flux passing through said space. Such armature preferably will be mounted on an electrically conductive spring leaf or reed that serves normally to bias the armature toward its position of maximum separation from one or both pole faces of this efficient type of transformer core.

Another object is to provide in series with the secondary winding of the transformer coil a spark gap which will be disrupted to pass a spark in only one direction responsively to voltage differentials of alternately reverse polarity occurring across the gap, and this without dependence on delicately related electrical characteristics of the induction coil and the utilization circuit.

Another object is to predetermine by automatic mechanical action the ability of the spark gap to limit the passing of a spark to a single direction thereacross, and to accomplish this electromagnetically by varying the resistive properties of the spark gap so that such properties change in synchronism with the building up and/or decay of magnetic flux in the armature core of the transformer occasioned by vibratory movement of its armature. Specifically the resistive property of the spark gap may be changed by electromechanically varying the width of gap.

A still further object of the invention is to include in a utilization circuit energized by my improved vibratory power supply electrical elements capable of smoothing out pulsating unidirectional current before delivering the same to an electrostatic load, such as the axial electrode of a Geiger-Mueller counter-tube, and capable of maintaining such potentials fairly constant at a voltage far exceeding that which has heretofore been obtainable from simplified types of vibratory power packs.

The foregoing and other objectives of the invention will appear more clearly from the following description of a successful embodiment having reference to the accompanying drawings wherein:

Fig. 1 is a diagram of an electrical converting system involving source and utilization circuits and incorporating the present invention.

Figs. 2 to 5, inclusive, show wave shapes respectively occurring in the system at points correspondingly designated as 2 to 5, inclusive, in Fig. 1.

Figure 6:
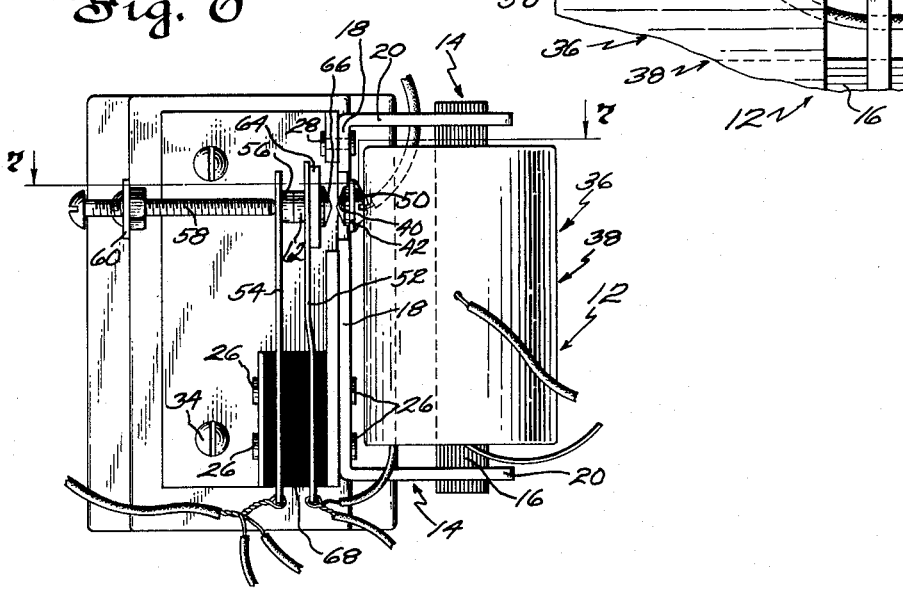
Fig. 6 shows in plan view the mechanical structure of a vibratory unit embodying features of the invention and capable of producing the wave shapes shown in Figs. 2 to 5.

In Fig. 6 the C-shaped or broken loop type of core of a step-up transformer 12 is designated 14 as a whole. It consists of a bar 16 of soft iron laminations firmly fixed at its ends in the U-shaped soft iron angle brackets 18—20 and 18'—20' whose respective ends 22 and 24 are spaced apart to form a small magnetic gap and thus affording the pole pieces of the core 14. Preferably nonferrous or brass rivets 26 and 28 fixedly secure brackets 18—20 and 18'—20' to an upstanding supporting flange of a non-ferrous, preferably brass, angle plate 30 which thus supports the entire transformer being itself fastened to a base 32 of insulative material by screws 34.

Transformer core 14 carries a primary winding 36 and a secondary winding 38 on its laminated bar 16 positioned and of a size to provide room for a circuit terminal 40 to be adjustably positioned in or directly opposite the aforesaid space between the magnetic pole ends 22 and 24. Terminal 40 forms one spark point of a current rectifying spark gap and projects from the free end of an electrically conductive spring leaf member 42 preferably of bronze or spring brass whose bent opposite end 44 is fixedly embedded as an insert in a slot in the insulative base 32. Within the length of spring leaf 42 there is a clearance opening 48 through which extends an adjusting screw 50 that threads into the insulative base 32. The resilience in leaf 42 constantly forces it against the head of screw 50 so that turning the latter finely adjusts the thus settable position of the stationary spark gap point 40 toward the left or toward the right in Fig. 6.

The holding rivets 26 for bracket 18 also serve to mount fixedly on the opposite side of the supporting flange of angle plate 30 the anchored end of a resilient reed 52 spaced broadside from and extending parallel with a leaf spring arm 54. A stationary contact 56 is carried on spring arm 54 near the free end thereof so that its stationary position may be finely adjusted and determined by a backing screw 58 frictionally mounted in a threaded hole in a supporting post 60 that is fixed in relation to the base 32 and angle plate 30. The spring tendency of arm 54 is to press constantly against the end of adjusting screw 50 which latter forms no part of any electrical circuit in the improved system. The anchored ends of reed 52 and spring arm 54 are spaced and insulated from each other and from the angle plate 30 and from holding rivets 26 by insulative material including the separator plates 68, so that reed 52 and spring arm 54 are electrically insulated from each other while each is separately conductive.

Reed 52 carries on its side facing stationary contact 56 a movable contact 62 that vibrates in unison with the reed into and out of conductive engagement with contact 56. On its opposite side reed 52 carries a small plate or armature 64 of soft iron wide enough to span the space between pole ends 22 and 24 of the transformer core and slightly offset facewise in relation thereto for a sufficient distance to permit vibratory movement of the armature toward and away from pole ends 22 and 24 without the armature leaving the path of magnetic flux between the pole ends 22 and 24, to which flux it is constantly sensitive. Facing the stationary spark point 40, armature 64 carries a vibratory spark point or dead-end terminal 66 of a utilization circuit whose variable distance from spark point 40 forming another dead end terminal of such utilization circuit alternately decreases and increases as the reed 52 vibrates respectively toward and away from the transformer core poles 22 and 24 under intermittent magnetic impulses exerted on the armature 64 by the transformer core when contacts 56, 62 make and break circuit.

Figure 7:
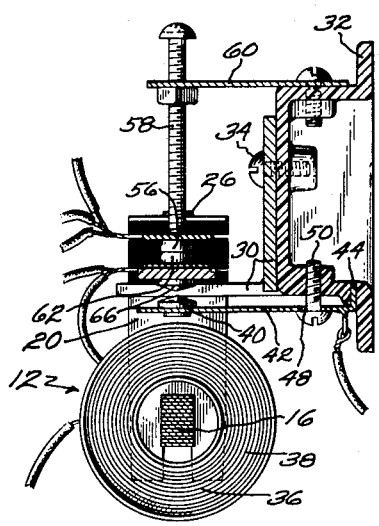
Fig. 7 is a view taken partly in section on the planes 7—7 in Fig. 6 looking in the direction of the arrows.
Figure 8:
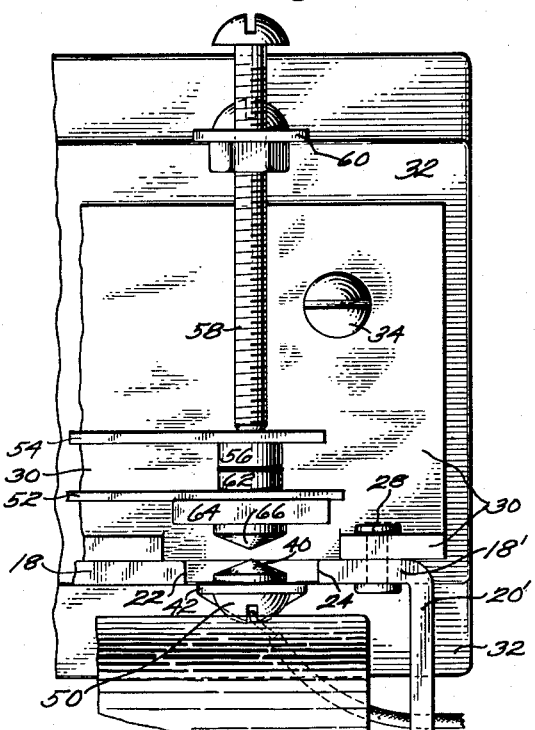
Fig. 8 is a fragmentary view of certain parts in Fig. 6 differently positioned and drawn on an enlarged scale.

The diagram in Fig. 1 shows a combination of source circuit and utilization circuit in which the vibrator unit of Figs. 6 to 8 is electrically incorporated in the following manner.

The source circuit contains a battery 70 connected by a lead 72 to the primary winding 36 of the transformer whose opposite end is connected by a lead 74 to the stationary mounted end of reed 52. The opposite side of the battery is connected by lead 76 to the stationary mounted end of spring arm 54. Incidentally the reed 52 and spring arm 54, and hence the interrupter contacts 56 and 62, are shunted by the usual arc preventive condenser 78. A manual on-and-off switch 80 is provided in the source circuit to disconnect the battery when not in use.

The utilization circuit contains the secondary winding 38 of the transformer, one end of which has electrical connection with the reed 52 through lead 82, and the other end of which may connect directly to the axial electrode of a Geiger-Mueller counter-tube 84 through lead 86. The cylindrical electrode of counter-tube 84 may connect directly to the stationary spark terminal 40 by means of lead 88. However in the system diagram of Fig. 1 the leads 86 and 88 are shown to place in the utilization circuit certain translative devices hereinafter more fully explained but which are not essential to the simplest form of utilization circuit adapted to contain and successfully energize a counter-tube requiring an impressed potential of a thousand volts or more for its successful operation.

Bridged across leads 86 and 88 there is a storage condenser 90, its charge limiting resistor 92, and a further condenser 94 which in conjunction with the resistor 96 are shown in the utilization circuit to serve as a conventional form of low-pass filter. Such low-pass filter is not essential to some purposes of the invention. Extraneous translative devices are shown in the utilization circuit consisting of a variable resistor 98, an ear phone 100 in shunt relation to its resistor 102, and a milliammeter at 104.

In first considering the operation, extraneous translative devices of the utilization circuit, including ear phone 100, its shunt resistance 102, the milliammeter 104 and the variable resistor or rheostat 98, may be disregarded as they are representative respectively of possible accessories such as detectors of radio-active emanations, current measuring means, and regulatory controls, sharing the utilization circuit with the electrostatic counting tube 84. An impressed substantially uniform potential as high as a thousand or more volts and of constant polarity is maintained on the axial conductor of counter-tube 84. The possible wave shape of this voltage is represented in Fig. 5. The intensity of this potential is subject to selective variation by the rheostat 98. The discharge current which it forces through the counter-tube when the gas in the latter is ionized by excitement of radio-active emanations is susceptible of measurement by the milliammeter 104 and the momentary passage of such current can produce a detectable sound in a properly attuned ear phone 100. Such impressed voltage results from vibratory conversion of a simple direct current supplied at, say, 10 volts, by a simple source battery 70. The D. C. amplification made possible by this invention easily amounts to more than one hundred to one and is attained through the simple function of but two circuit interrupting contacts 56—62 with the cooperative assistance of the two terminal points 40—66 of the automatically varied synchronous spark gap of these improvements.

Fig. 2 represents the current wave through the primary winding of the transformer showing that the current rises when contacts 56—62 are first closed until a magnetic field is built up in the transformer to the maximum strength of which source battery 70 is capable. By the time this rate of building ceases to rise, because of core saturation in the transformer, the armature attracting magnetic flux across core poles 22—24 becomes strong enough to overcome the contact closing bias of reed 52 and thereupon separates contacts 56—62. The familiar abrupt drop in the curve in Fig. 2 will result. Simultaneously with rise of the current curve in Fig. 2 there will be induced in the secondary 38 of the transformer a voltage change represented by that portion of the wave pictured in Fig. 3 which first dips to a negative value and then rises to a much higher positive value owing to the inductive kick at the instant contacts 56—62 separate. This augmented rise of voltage builds up across the variable spark gap 40—66 a differential of potential that would be incapable of disrupting the gap at its widest, as when contacts 56—62 are closed, but that operates to spark through this gap only when the gap has become narrowed by that movement of reed 52 which opens contacts 56—62. On these occasions, depending on which terminal of battery 70 is wired to connect with spring arm 54, the same one of spark terminals 40 or 66 will always possess the higher potential. Hence the spark in a given wiring of the source battery 70 will always pass in only a like direction across the gap. It will be understood that the spark gap points or circuit terminals 40—66 never actually close. There is thus avoided the wear and pitting that would characterize the action of circuit breaking contacts if a multiplicity of such contacts were to be employed to discharge from one condenser into another as a way of building up high voltage for a utilization circuit.

The abrupt fall of the voltage curve to its starting point diagrammed in Fig. 3 shows the effect of the spark discharge on the transformer secondary and on the utilization circuit across the storage capacitor 90. Thus this capacitor becomes charged to an extent determined by the excess of the highest value of the positive peak of the curve over the less value of the negative peak of the curve, all as is further modified and limited by the shunt resistance 92. Thus storage condenser 90 will constantly maintain the same polarity in the utilization circuit which as represented in Fig. 4 is always a positive polarity in the hook-up shown in the drawings. Meanwhile there exists an unbalanced form of alternating current in the transformer secondary generated by the action of the interrupter contacts 56—62 aided by the inductive effects in the transformer. The constant polarity in the utilization circuit represented in Fig. 4 is characterized by a voltage whose uniformity is subject to peak interruptions occurring as indicated in Fig. 4 each time a spark is discharged across the gap 40—66 which increases the charge on condenser 90. Such interrupting peaks may be smoothed out by the usual filter resistor 96 and capacitor 94 in well understood manner, so that the resultant voltage that is constantly impressed on the counter-tube 84 will be more uniform as represented by the voltage curve diagrammed in Fig. 5.

In Figs. 2 to 5, the time abscissas are in vertical alignment to indicate instantaneous coincidence in directional progress of the comparative curves although the ordinates of these graphs are not proportional to the quantitative values of the current or voltages represented. The curves approximate respectively such oscillograms as might be obtained simultaneously at the points in the system designated by the numerals 2 to 5 in Fig. 1. The axis or no-voltage ordinate is in each graph represented by the horizontal broken line.

As a practical guide to practice of this invention and without restriction of its scope to any details more limited than come within the broadest interpretation of the appended claims, the following electrical values may be chosen for the various elements of the system diagrammed in Fig. 1.

| Element | Value |
|---|---|
| Battery (70) | 10 volts. |
| Ratio of turns (secondary 38 to primary 36) | 1000 to 1. |
| Condenser (78) | 200 mf. —6 volts. |
| Variable spark gap (40—66) | .100″ to .010″. |
| Reed vibration frequency (52) | 40 to 100 cycles per second. |
| Condensers (90 and 94) | .02. |
| Resistors (92 and 96) | 10 megohms. |
| Load (84) | 10 to 100 megohms. |
| Spark point material | Tungsten, molybdenum or suitable alloys. |

The foregoing values and ranges of values may be varied as dictated by conditions, suitable conditions being indicated when the stationary contact positioning screw 58 and the stationary spark gap terminal 40 are so set that a maximum steady reading appears on a test electrostatic voltmeter applied at any point in the utilization circuit beyond the filtering elements 94, 96, as for instance at location 5 in Fig. 1.

The following claims are directed to and intended to cover all equivalents and substitutes for the particular elements and combinations herein disclosed as reasonably come within the broadest interpretations of the claim language.

I claim:

1. An electrical converting system for supplying a high potential of continuous polarity through the medium of a current rectifying spark gap, including in combination with a source circuit, a transformer including a primary winding in said source circuit and having a saturable core magnetically energizable thereby, a low voltage source of direct current in said circuit, a vibratory armature movably mounted within the field of magnetic flux generated in said core by said primary winding, circuit interrupting contacts in series with said direct current source and said primary winding at least one of said contacts being connected to said armature in a manner to move therewith, a secondary winding of said transformer electrically energizable by changes of said flux strength, a utilization circuit containing said secondary winding, never-touching electric terminals constituting dead ends of said utilization circuit spaced apart to form an always open spark gap therebetween, at least one of said terminals being movable relatively to another of said terminals and mechanically connected to said armature in a manner to be moved thereby in directions to vary the width of said spark gap.

2. An electrical converting system for supplying a high potential of continuous polarity through the medium of a current rectifying spark gap, including in combination with a source circuit, a transformer including a primary winding in said source circuit and having a saturable core magnetically energizable thereby, a low voltage source of direct current in said circuit, circuit interrupting contacts in series with said direct current source and said primary winding, a vibratory armature movably mounted within the field of magnetic flux generated in said core by said primary winding and carrying at least one of said contacts, a secondary winding of said transformer electrically energizable by changes of said flux strength, a utilization circuit containing said secondary winding, never-touching electric terminals constituting dead ends of said utilization circuit spaced apart to form an always open spark gap therebetween, at least one of said terminals being movable relatively to another of said terminals and mechanically connected to said armature in a manner to be vibrated in synchronism with vibrations of said armature toward and away from the other of said terminals wherefore to vary the width of said spark gap in synchronism with changes in said flux strength in said core and in synchronism with consequent changes of voltage induced thereby in said secondary winding and utilization circuit.

3. An electrical converting system as defined in claim 1, in which the said core and the said armature form a substantially closed magnetic circuit, both of the said windings surrounding a common straight extent of said core.

4. An electrical converting system as defined in claim 1, in which the said core is of shape to frame a quadrilateral space and contains a break at one side of said space bridged magnetically by said armature and carries both of the said windings at another and common side of said space.

5. An electrical converting system as defined in claim 2, in which the said one of the said terminals and the said one of the said circuit breaking contacts are carried by the said armature in such relation to each other and in such relation respectively to the other of the said terminals and to the other of the said contacts that the said spark gap possesses minimum width at substantially the same instant the said source circuit is interrupted by said contact.

6. An electrical converting system as defined in claim 2, in which the said one of the said terminals and the said one of the said circuit breaking contacts are carried by the said armature in such relation to each other and in such relation respectively to the other of the said terminals and to the other of said contacts that the said spark gap possesses maximum width while the said circuit interrupting contacts are closed.

7. An electrical converting system as defined in claim 2, in which the said one of the said terminals and the said one of the said circuit breaking contacts are carried by the said armature in such relation to each other and in such relation respectively to the other of the said terminals and to the other of said contacts that the said spark gap possesses minimum width at substantially the same instant the said source circuit is interrupted by the said armature carried contact and possesses maximum width while the said circuit interrupting contacts are closed.

8. An electrical converting system as defined in claim 2, in which the said armature and the said one of the said terminals are carried in common on a single resilient reed.

9. An electrical converting system as defined in claim 2, in which the said transformer core exerts magnetic pull on said armature in a direction to open the said circuit interrupting contacts, together with a swingable member carrying both the said armature and the said one of the said terminals, and resilient means operatively related to said member in a manner to bias said member in a direction to close the said circuit interrupting contacts.

10. In a vibratory power supply, the combination with a source circuit and a utilization circuit, of a transformer having a core with a primary winding and a secondary winding, a vibratory circuit interrupter in said source circuit impulsed magnetically by said core, electric circuit terminals spaced apart in said utilization circuit wherefore to interpose an always open spark gap constituting electrical resistance in said utilization circuit, and gap fluctuating connections operably relating at least one of said terminals to said vibratory circuit interrupter.

11. In a vibratory power supply, the combination defined in claim 10, in which one of the said electric circuit terminals is movable relatively to the other said electric circuit terminal by and in accordance with circuit making and breaking movement of the said vibratory circuit interrupter and in a manner to vary the resistance of the said spark gap.

12. The combination of, a transformer having a core, a vibrator electromagnetically responsive to said core, a primary electric circuit containing a primary winding for energizing said core and including primary circuit interrupting contacts arranged to be opened and closed by said vibrator, a secondary electric circuit inductively coupled to said primary circuit, and permanently separated electric terminals constituting dead ends of said secondary circuit and affording a spark gap therein, at least one of said terminals being connected to said vibrator in a manner to be movable thereby.

13. The combination defined in claim 12, in which the said core is loop-shaped and contains a complete break rendering said loop-shaped core discontinuous, and the said vibrator includes an armature magnetically spanning said break in a manner to complete in conjunction with said core a substantially closed magnetic circuit for flux generated by said primary winding.

14. The combination defined in claim 13, in which the said armature carries the said movable one of the said spark gap affording terminals.

15. The combination defined in claim 13, in which the said armature carries at least one of the said circuit interrupting contacts and the said movable one of the said spark gap affording terminals.

16. The combination defined in claim 13, together with a spring reed carrying the said armature, and carrying on one of its sides at least one of the said circuit interrupting contacts, and carrying on its other side the said movable one of the said spark gap affording terminals.

17. The combination defined in claim 16, in which one of the said contacts and one of the said terminals are stationary, together with adjustably mounted means carrying said stationary contact, and separate adjustably mounted means carrying said stationary terminal, whereby the absolute and relative positions of said stationary contact and said stationary terminal can be varied and predetermined for selectively relating the time of opening of the said contacts to the synchronous degree of mutual proximity of the said terminals.

18. A vibratory electrical converter comprising a transformer having primary and secondary windings with a common saturable core, an electrically conductive vibratory reed, a reed motivating armature responsive to magnetic flux in said core, a power supplied stationary electric contact conductively engageable by said reed, a power receptive stationary circuit terminal approachable by said reed in a manner to reduce the width of a spark gap therebetween, one end of each of said primary and secondary transformer windings being in permanent electrical connection with said reed.

References Cited in the file of this patent

UNITED STATES PATENTS

| | | |
|---|---|---|
| 1,578,998 | Jakosky | Mar. 30, 1926 |
| 1,580,804 | Baumeister | Apr. 13, 1926 |
| 1,935,569 | Keogh | Nov. 14, 1933 |
| 2,113,762 | James | Apr. 12, 1938 |